United States Patent
Mattern et al.

(10) Patent No.: US 10,266,023 B2
(45) Date of Patent: Apr. 23, 2019

(54) SYSTEM TO AUTOMATE HITCHING A TRAILER

(71) Applicant: Ford Global Technologies, LLC, Dearborn, MI (US)

(72) Inventors: Donald Jacob Mattern, Canton, MI (US); Hongtei Eric Tseng, Canton, MI (US); John Paul Shaw, Dearborn, MI (US); Jill Plavcan, Canton, MI (US); Lisa Yeung, Ann Arbor, MI (US); Thomas Edward Pilutti, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 15/583,014

(22) Filed: May 1, 2017

(65) Prior Publication Data

US 2018/0312022 A1 Nov. 1, 2018

(51) Int. Cl.
| | |
|---|---|
| *B60D 1/36* | (2006.01) |
| *B62D 15/02* | (2006.01) |
| *B60R 1/00* | (2006.01) |
| *B60D 1/06* | (2006.01) |
| *B60W 50/14* | (2012.01) |
| *B62D 5/04* | (2006.01) |
| *B60W 10/04* | (2006.01) |
| *B60W 10/10* | (2012.01) |

(Continued)

(52) U.S. Cl.
CPC ............... *B60D 1/36* (2013.01); *B60D 1/065* (2013.01); *B60R 1/00* (2013.01); *B60W 50/14* (2013.01); *B62D 5/046* (2013.01); *B62D 15/021* (2013.01); *B62D 15/026* (2013.01); *B60K 2350/1028* (2013.01); *B60K 2350/2013* (2013.01); *B60R 2300/105* (2013.01); *B60R 2300/303* (2013.01); *B60R 2300/607* (2013.01); *B60R 2300/808* (2013.01); *B60W 10/04* (2013.01); *B60W 10/10* (2013.01); *B60W 10/18* (2013.01); *B60W 10/20* (2013.01); *B60W 2050/143* (2013.01); *B60W 2050/146* (2013.01); *B60W 2420/42* (2013.01); *G05D 1/0016* (2013.01); *G05D 1/0038* (2013.01); *G05D 1/0246* (2013.01)

(58) Field of Classification Search
CPC ............................. B60D 1/36; B60R 2300/808
See application file for complete search history.

(56) References Cited

U.S. PATENT DOCUMENTS

| | | |
|---|---|---|
| 7,777,615 B2 | 8/2010 | Okuda et al. |
| 8,191,915 B2 | 6/2012 | Freese, V et al. |

(Continued)

FOREIGN PATENT DOCUMENTS

| | | |
|---|---|---|
| DE | 102012005707 A1 | 10/2012 |
| DE | 102014110498 A1 | 1/2016 |

*Primary Examiner* — Todd M Melton
(74) *Attorney, Agent, or Firm* — Raymond Coppiellie; Price Heneveld LLP

(57) ABSTRACT

A vehicle hitch assistance system includes an imaging system, a steering system, a dead reckoning system, and a controller. The controller determines a hitch location within a vehicle exterior image received from the camera system, derives a vehicle path to align a hitch ball of the vehicle with the hitch location, and controls the steering system to guide the vehicle along the path including tracking the location of the vehicle using information received from the dead reckoning system.

20 Claims, 9 Drawing Sheets

(51) Int. Cl.
*B60W 10/20* (2006.01)
*B60W 10/18* (2012.01)
*G05D 1/00* (2006.01)
*G05D 1/02* (2006.01)

(56) References Cited

U.S. PATENT DOCUMENTS

| | | | |
|---|---|---|---|
| 9,696,723 B2* | 7/2017 | Zeng | G05D 1/0246 |
| 9,889,714 B2* | 2/2018 | Bochenek | B60D 1/36 |
| 2012/0283909 A1 | 11/2012 | Dix | |
| 2014/0012465 A1 | 1/2014 | Shank et al. | |
| 2016/0052548 A1 | 2/2016 | Singh et al. | |
| 2017/0282658 A1* | 10/2017 | Shepard | B60D 1/36 |
| 2018/0181142 A1* | 6/2018 | Baran | B60D 1/62 |

* cited by examiner

SYSTEM TO AUTOMATE HITCHING A TRAILER

FIELD OF THE DISCLOSURE

The present disclosure generally relates to a vehicle system for assisting in aligning the vehicle for hitching with a trailer. In particular, the system controls the steering of the vehicle to bring the vehicle hitch ball into alignment with a trailer hitch.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instance of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer.

SUMMARY OF THE DISCLOSURE

According to one aspect of the present disclosure, a vehicle hitch assistance system includes an imaging system, a steering system, a dead reckoning system, and a controller. The controller determines a hitch location within a vehicle exterior image received from the imaging system, derives a vehicle path to align a hitch ball of the vehicle with the hitch location, and controls the steering system to guide the vehicle along the path including tracking the location of the vehicle using information received from the dead reckoning system.

Embodiments of this aspect of the invention can include any one or a combination of the following features:
- the imaging system includes a plurality of cameras capturing images collectively surrounding the vehicle, and the controller receives image data from each of the plurality of cameras and assembles the image data into the vehicle exterior image as an overhead view of an area surrounding the vehicle;
- a human-machine interface having a touchscreen is included, wherein the controller further displays the vehicle exterior image on the touchscreen and determines the hitch location by receiving a user-indication of the hitch location through an input on the touchscreen;
- the controller further determines the hitch location by applying a coordinate system to the vehicle exterior image and correlating a location of the input on the touchscreen with the coordinate system;
- the controller further determines the hitch location by processing the vehicle exterior image within an area adjacent a location of the input to identify a hitch within the area;
- a transmission system is included, wherein deriving the vehicle path includes determining at least one directional inflection point requiring a change in a condition of the transmission system between a forward-driving mode and a rearward-driving mode;
- when tracking the location of the vehicle using information received from the dead reckoning system indicate that the location of the vehicle corresponds with the at least one direction inflection point, the controller indicates to a driver that the change in condition of the transmission system is required;
- the controller is in communication with the transmission system and, when tracking the location of the vehicle using information received from the dead reckoning system indicates that the location of the vehicle corresponds with the at least one direction inflection point, the controller causes the transmission system to implement the required change in condition thereof; or
- a brake system and a throttle is included, wherein the controller further controls the brake system and throttle to cause movement of the vehicle along the vehicle path in conjunction with controlling the steering system to guide the vehicle along the path.

According to another aspect of the present disclosure, a vehicle includes a plurality of cameras capturing images collectively surrounding the vehicle, a human-machine interface including a display and a controller. The controller assembles image data received from each of the plurality of cameras into an overhead vehicle exterior image, presents the image on the display, receives a user-indication of a hitch location through the human-machine interface, and derives a vehicle path to move a hitch ball of the vehicle into the hitch location.

According to another aspect of the present disclosure, a method for guiding vehicle into alignment with a trailer hitch includes presenting an overhead vehicle exterior image on a display within the vehicle, receiving a user input indicating an area on the display, correlating the area on the display with a coordinate system applied to the image and setting the input location as a hitch location, deriving a vehicle path to align a hitch ball of the vehicle with the hitch location, and controlling a vehicle steering system to guide the vehicle along the path.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
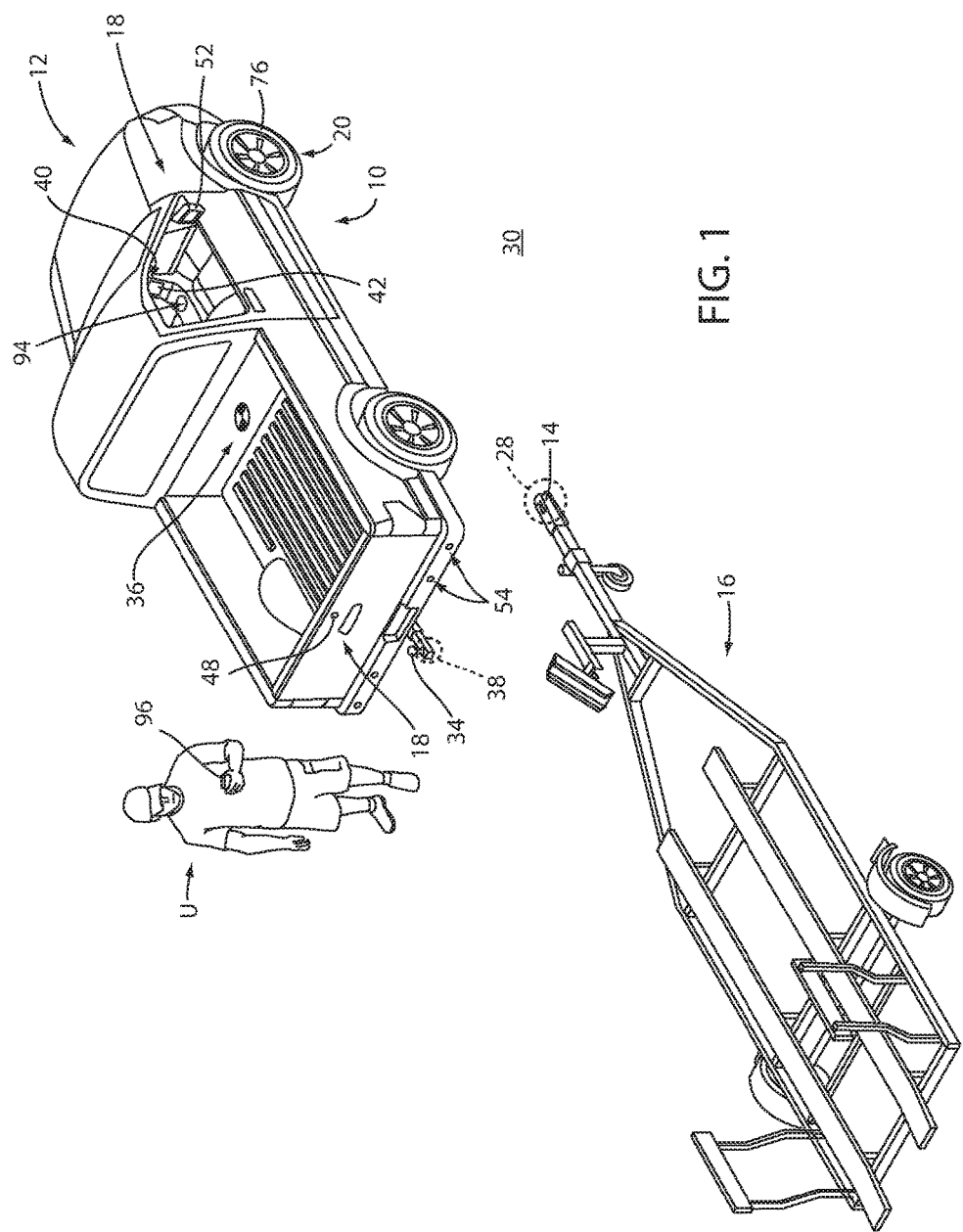
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 2:
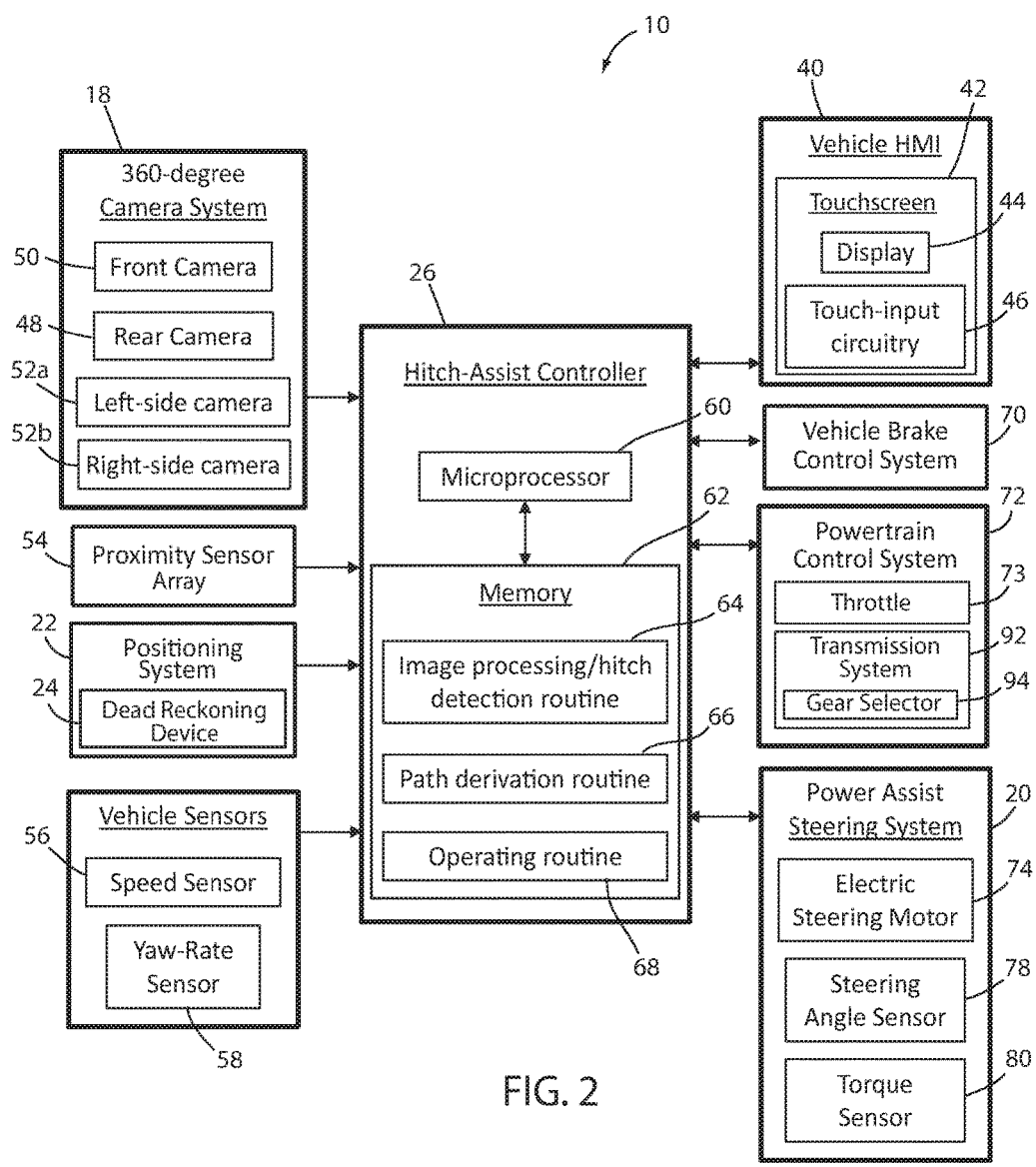
FIG. 2 is a diagram of a system according to an aspect of the disclosure for assisting in aligning the vehicle with a trailer in a position for hitching the trailer to the vehicle.

Referring to FIGS. 1 and 2, reference numeral 10 generally designates a system for assisting or otherwise controlling a vehicle 12, in whole or in part, in aligning with a hitch 14 of a trailer 16 for coupling the trailer 16 with the vehicle 12. The so-called hitch assist system 10 includes an imaging system, which in an embodiment may be in the form of a camera system 18, a steering system 20, and a positioning system 22, which in an embodiment may comprise a dead reckoning system or device 24. Hitch assist system 10 further includes a controller 26 determining a location 28 (FIG. 4) of the hitch 14 of the trailer 16 within an image 30 (FIG. 3) of, or directed to, an exterior 32 of vehicle 12, the image 30 being received from the camera system 18. The controller 26 further derives a vehicle path 32 (FIG. 6) to align a hitch ball 34 of the vehicle 12 with the hitch location 28 and controls the steering system 20 to guide the vehicle 12 along the path 32, which includes tracking a position 36 of the vehicle 12 using information received from the positioning system 22.

With respect to the general operation of the hitch assist system 10, as illustrated in the system diagram of FIG. 2, system 10 includes various sensors and devices that obtain or otherwise provide vehicle status-related information. This information includes positioning information from positioning system 22, which may include the above-mentioned dead reckoning device 24 or, in addition or as an alternative, a global positioning system (GPS), to determine a coordinate location of the vehicle 12 based on the one or more locations of the devices within the positioning system 22. In particular, the dead reckoning system 24 can determine the coordinate location of the vehicle 12 within a localized coordinate system based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of the trailer 16, that the controller 26 of the hitch assist system 10 may process with various routines to determine an indicator of the hitch location 28, such as a range of hitch locations 28.

As further shown in FIG. 2, one embodiment of the hitch assist system 10 is in communication with the steering system 20 of vehicle 12, which may be a power assist steering system including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command may be provided by the hitch assist system 10 for autonomously steering during a trailer hitch alignment maneuver and may alternatively be provided manually via a rotational position (e.g., steering wheel angle) of a steering wheel (FIG. 1). However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 6:
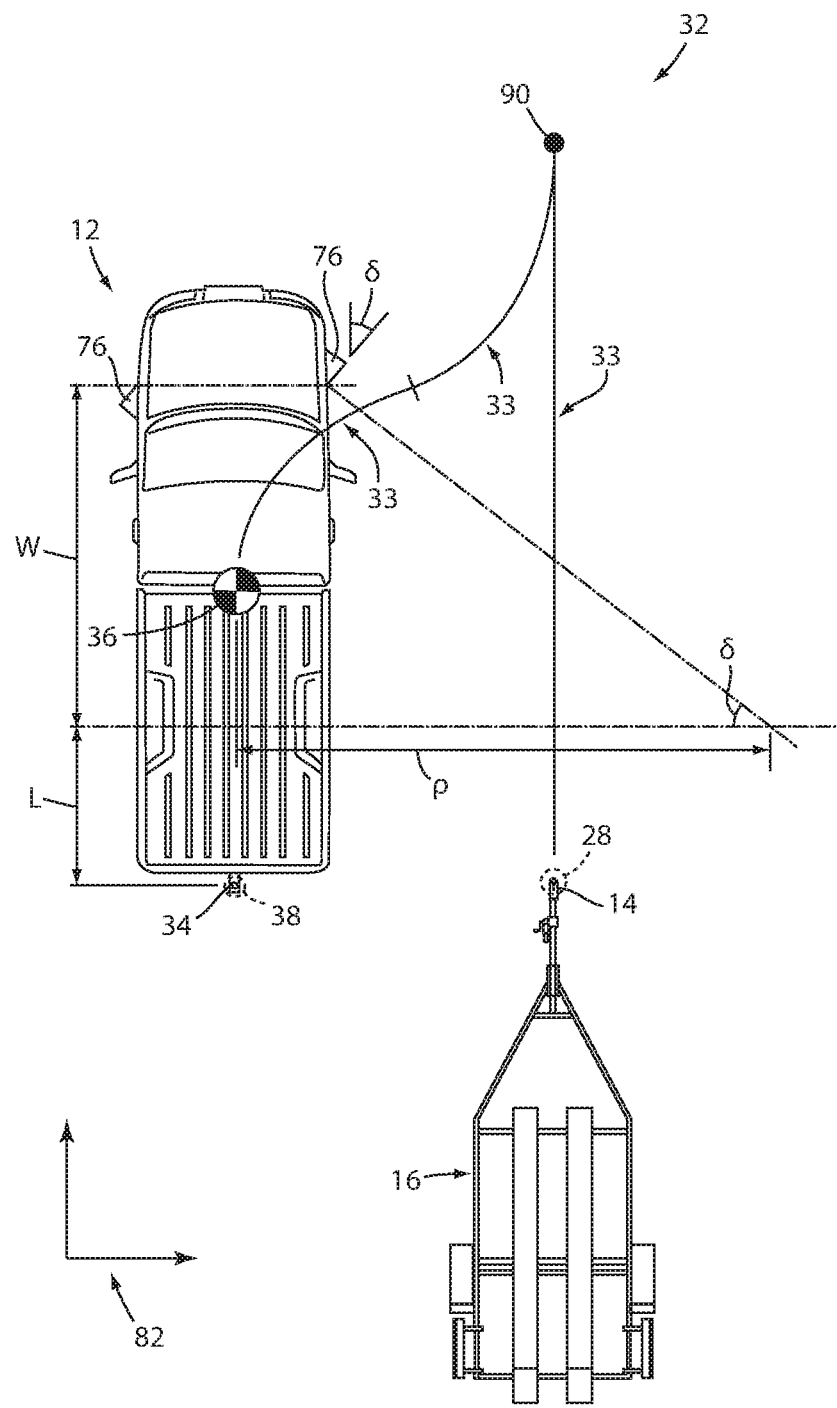
FIG. 6 is an overhead schematic view of a vehicle during a step of the alignment sequence with the trailer.
Figure 7:
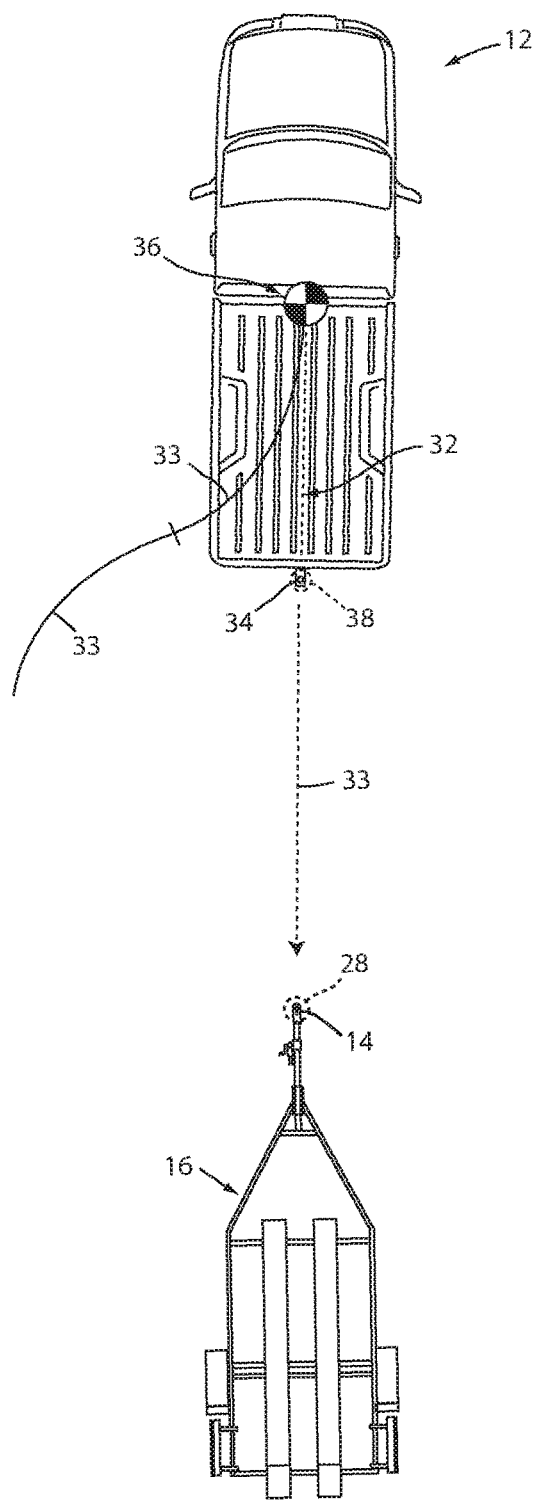
FIG. 7 is an overhead schematic view of the vehicle during a subsequent step of the alignment sequence with the trailer.
Figure 8:
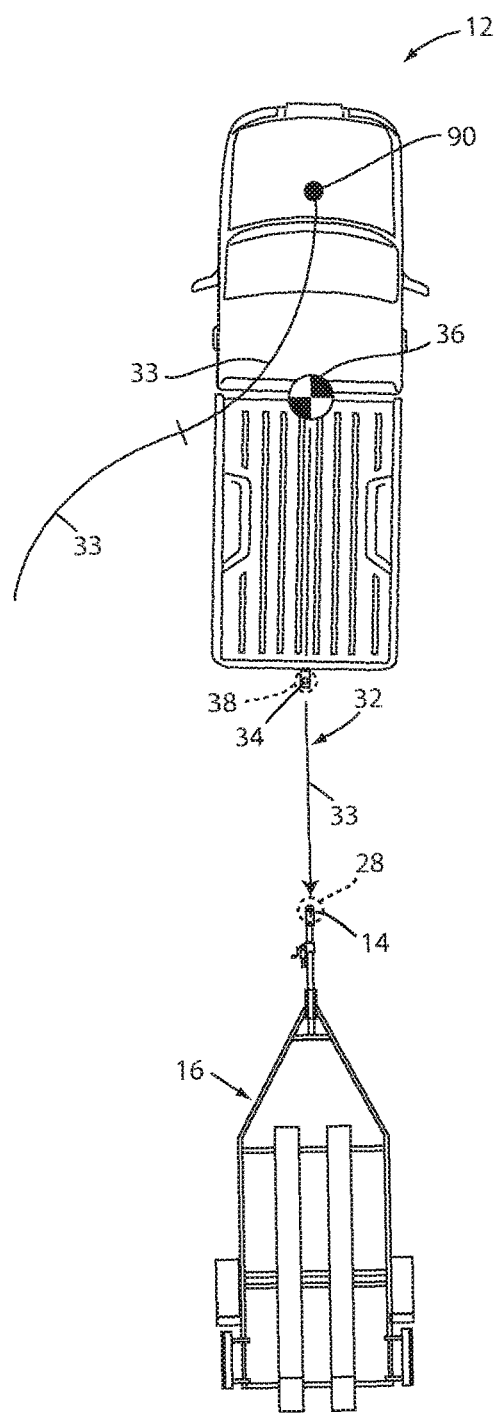
FIG. 8 is an overhead schematic view of the vehicle during a subsequent step of the alignment sequence with the trailer.
Figure 9:
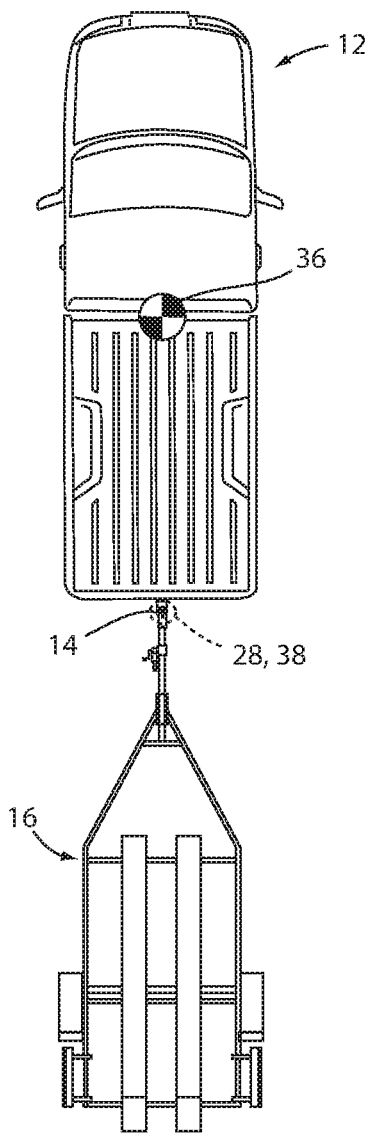
FIG. 9 is an overhead schematic view of the vehicle during a subsequent step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 6). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the camera system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10 in some embodiments may regulate speed of the vehicle 12 during alignment of the vehicle 12 with a trailer 16, which can reduce the potential for a collision with trailer 16, for example. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human machine interface (HMI) 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like. Further, the hitch assist system 10 may communicate via wireless communication with another embodiment of the HMI 40, such as with one or more handheld or portable devices 96, including one or more smartphones. The portable device may also include the display 44 for displaying one or more images and other information to a user. For instance, the portable device may display one or more images of the trailer 16 and an indication of the determined hitch location 28 on the display 44 and may further be able to receive remote user inputs via touchscreen circuitry 46. In addition, the portable device may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the camera system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 of travel for alignment with the trailer 16. The controller 26 may include the microprocessor 60 and/or other analog and/or digital circuitry for processing one or more routines. Also, the controller 26 may include the memory 62 for storing one or more routines, including an image processing and/or hitch detection and locating routine 64, a path derivation routine 66 and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems.

Figure 3:
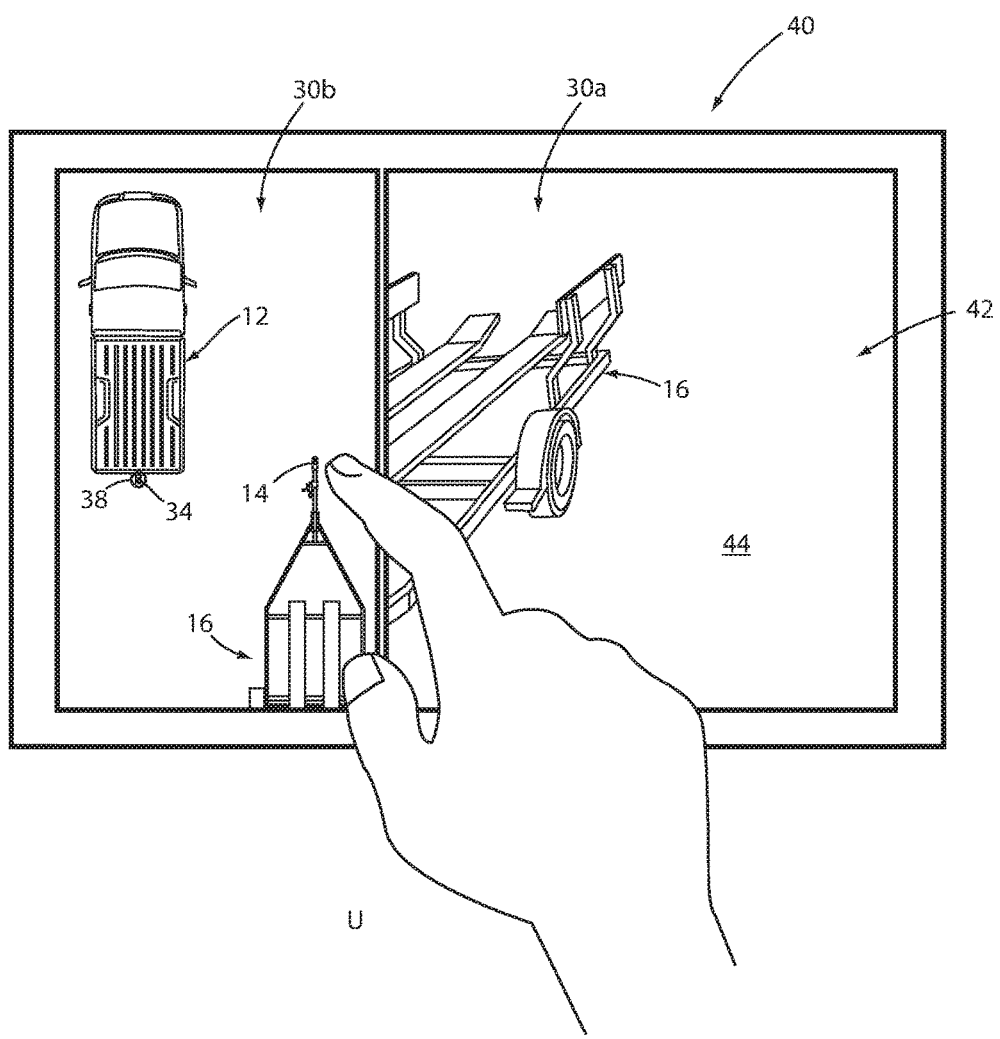
FIG. 3 is a front view of a vehicle human-machine interface ("HMI") during a step of a user locating a trailer hitch in an image presented by the system.
Figure 4:
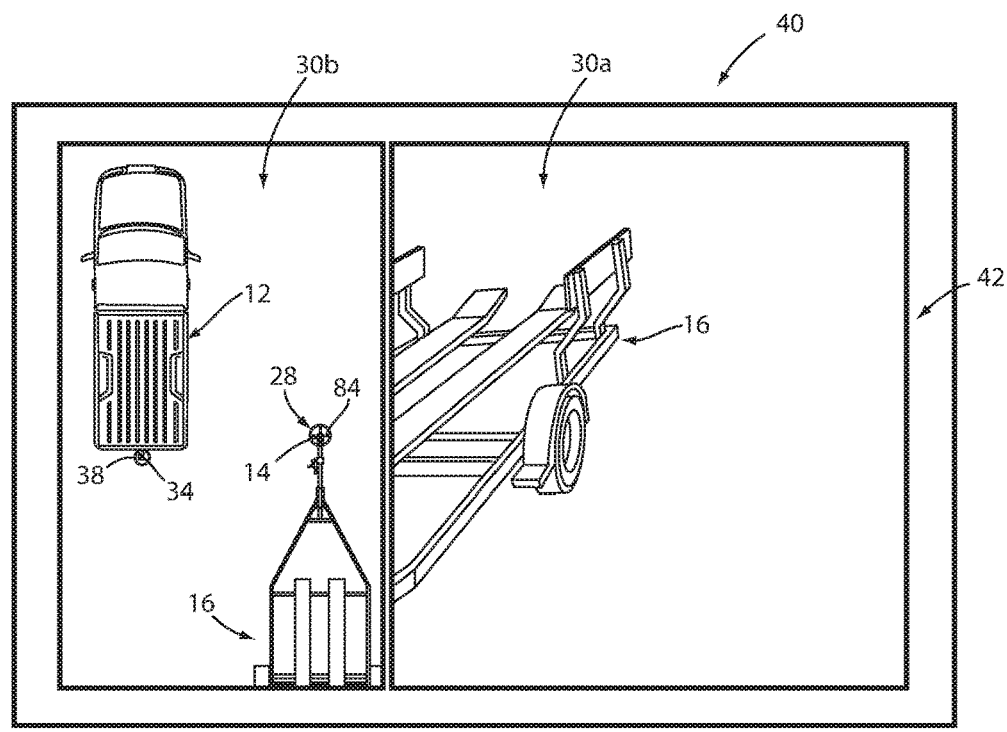
FIG. 4 is a front view of the HMI during a subsequent step of an alignment sequence.

The above-mentioned incorporation of touchscreen 42 into HMI 40 can facilitate determining the hitch location 28 by accepting user input regarding the hitch location 28 within an image captured by the above-mentioned imaging system. In the above-described example, an image or images from camera system 18 can be presented on touchscreen 42. In one aspect, camera system 18 can include rearview camera 48, which is positioned and configured for capturing an image of a view beyond the rear of vehicle 12. This image can be presented on its own on touchscreen 42 or a portion thereof, as depicted in FIG. 3 as rearview image 30*a*. In such an aspect, a user U can provide a touch input on touchscreen 42 corresponding with a location thereon showing the hitch 14 of trailer 16. Controller 26, which may employ image processing routine 64 to present rearview image 30*a* on touchscreen 42 may further receive the input from the touch circuitry 46 of touchscreen 42 and correlate the user-indicated location 28 of hitch 14 with the image data corresponding with rearview image 30*a* determine or infer a location 28 of hitch 14 with respect to vehicle 12.

In an additional or alternative aspect, the camera system 18 may include a plurality of cameras directed outwardly from vehicle 12 from a plurality of corresponding locations that are configured to collectively capture a view surrounding vehicle 12. Such a 360-degree camera system 18 may include the above-mentioned rear camera 48 or an additional rear camera or cameras, as well as a front-facing camera 50 and respective side cameras 52*a*,52*b* directed respectively outwardly from the driver and passenger sides of vehicle 12. Camera system 18 may include additional cameras, as needed to provide respective portions of the desired 360-degree view surrounding vehicle 12, which may include, for example, corner cameras or additional rear, front, and/or side cameras and may depend on the particular size or configuration of vehicle 12. In a further variation, the imaging system can incorporate a generally non-visual device or apparatus that, in some instances, can be shared with or otherwise used by positioning system 24. In one example, the imaging system can use RADAR, LIDAR, one or more of ultrasonic sensors 54, or combinations thereof. These systems can be used to determine the location, size, and, optionally, identifying profiles, of objects surrounding vehicle 12, and can, accordingly, identify the location and positioning of trailer 16.

When camera system 18 is configured as the described or similar 360-degree camera system, the image processing routine 64 can be further configured to assemble the respective images from the various cameras 48,50,52*a*,52*b* into a single image, which may be in the form of a panoramic 360-degree view, or may be in the form of the bird's-eye view 30*b* shown in FIG. 3. In either aspect, the image processing routine 64 may digitally stitch together the images such that the portions of the adjacent edges of the individual images align to give the appearance of a cohesive whole. Additional processing may be performed to adjust the viewpoint and/or perspective of the images to emulate a single camera. In particular, in assembling the depicted bird's-eye view, the cameras 48,50,52*a*,52*b* may be positioned to capture portions of the ground immediately adjacent vehicle 12 and extending outwardly therefrom, and the image processing routine 64 can adjust and crop the respective images based on known characteristics and locations of the cameras 48,50,52a,52b to emulate a view taken from directly above vehicle 12 and to interpose a digital image of vehicle 12 at the center of the depicted rearview image 30a. In the alternative, described above, wherein the imaging system includes a non-visual device, image processing routine 64 can derive an image based on the information or data received from the non-visual device to replace or emulate the overhead image depicted in FIG. 3.

In addition to assembling image 30b, the image processing routine 64 can also use the known camera characteristics and positioning to apply a coordinate system 82 to the image 30a. Although such application can be done with either image 30a or 30b, the emulated two-dimensional view of image 30b may be advantageous for use with such a coordinate system 82, as it corresponds more directly with the two-dimensional configuration of the circuitry 46 within touchscreen 42. As shown in FIG. 3, the use of the bird's eye view 30b for determination of hitch location 28 (FIG. 4) may also allow for such determination when hitch 14 is not in the view 30a of the rear camera 48 alone, such as when trailer 16 is positioned to the side (or in front of) vehicle 12. In this manner, the user U can visually determine the position of hitch 14 within image 30b and can provide a touch input on screen 42 in such a location by touching or tapping image 30b on the location 28 of hitch 14 therein. The image processing routine 64 can then correlate the location of the touch input with the coordinate system 82 applied to image 30b. Because the coordinate system 82 is calibrated to correspond with the real-world coordinate system surrounding vehicle 12 and employed by positioning system 22, the touch input can be used by image processing routine 64 to determine the hitch location 28 with respect to vehicle 12.

The image processing routine 64 can optionally provide for adjustment or refinement of the determined hitch location 28 based on the user input. In one example, the image processing routine 64 itself can be programmed or otherwise configured to initially interpret the location of the input received from user U as the indication of a target area 84 within which hitch 14 is located. Image processing routine 64 can then identify the actual hitch 14 within the image data based on stored or otherwise knows visual characteristics of hitch 14 or hitches in general. In this respect, controller 26 may be able to determine hitch location 28 within target area 84 to a degree greater than the resolution of touchscreen 42, including that which a circuitry 46 may provide. Additionally, or alternatively, controller 26 may seek confirmation of the hitch location 28, determined either directly using the user input or the target area refinement, through a prompt 86 on touchscreen 42. If the location is not confirmed, further image processing may be provided, or user-adjustment of the hitch location 28 may be facilitated, either using touchscreen 42 or another input to allow the user to move the depicted hitch location 28 on screen 42, which controller 26 uses to adjust the determination of hitch location 28 with respect to vehicle 12 based on the above-described use of coordinate system 82.

Figure 5:
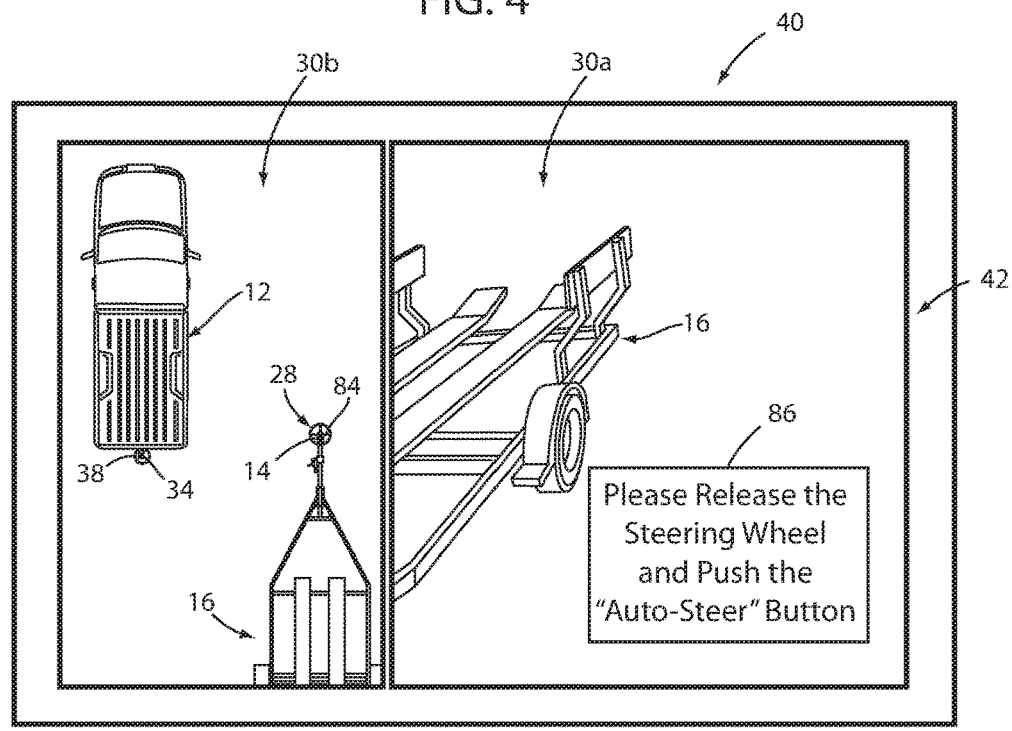
FIG. 5 is a front view of the HMI during a further subsequent step of the alignment sequence.

As shown in FIG. 5, once the hitch location 28 has been determined and, optionally, confirmed by the user U, controller 26 can take control of at least the vehicle steering system 20 to control the movement of vehicle 12 along the desired path 32 (FIG. 6) to align the vehicle hitch ball 34 with hitch 14. Accordingly, an additional prompt 86 can be provided via HMI 40 to direct the user U to release the steering wheel so that controller 26 can control steering system 20, as needed.

Referring now to FIG. 6 with additional continued reference to FIG. 2, controller 26, having determined the hitch location 28 using coordinate system 82 and image 30a, as discussed above, can execute path derivation routine 66 to determine vehicle path 32 to align the vehicle hitch ball 34 with hitch 14. In particular, controller 26 can have stored in memory 62 various characteristics of vehicle 12, including the wheelbase W, the distance from the rear axle to the hitch ball 34, which is referred to herein as the drawbar length L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta}. \tag{1}$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \tag{2}$$

Path derivation routine 66 can be programmed to derive vehicle path 32 to align a known location 38 of the vehicle hitch ball 34 with hitch 14 that takes into account the determined minimum turning radius $\rho_{min}$ to allow path 32 to use the minimum amount of space and maneuvers. In this manner, path routine 66 can use the position of vehicle 12, which can be based on the center 88 of vehicle 12, a location along the rear axle, the location of the dead reckoning device 24, or another known location on the coordinate system 82, to determine both a lateral distance to the hitch 14 and a forward or rearward distance to hitch 14 and derive a path 32 that achieves the needed lateral and forward-backward movement of vehicle 12 within the limitations of steering system 20. The derivation of path 32 further takes into account the positioning of hitch ball 34, based on length L, relative to the tracked location 36 of vehicle 12 (which may correspond with the center of mass of vehicle 12, the location of a GPS receiver, or another specified, known area) to determine the needed positioning of vehicle 12 to align hitch ball 34 with hitch 14.

As discussed above, once the desired path 32 has been determined, controller 26 is then allowed to at least control the steering system 20 of vehicle 12 with the powertrain system 72 and the brake system 70 (whether controlled by the driver or by controller 26, as discussed below) controlling the velocity (forward or rearward) of vehicle 12. In this manner, controller 26 can receive data regarding the position 36 of vehicle 12 during movement thereof from positioning system 22 while controlling steering system 20, as needed to maintain vehicle 12 along path 32. In particular, the path 32, having been determined based on the vehicle 12 and steering system 20 geometry, can adjust the steering angle $\delta$, as dictated by path 32, depending on the position of vehicle 12 therealong. It is additionally noted that in an embodiment, the path 32 may comprise a progression of steering angle $\delta$ adjustment that is dependent on the tracked vehicle position 36.

As illustrated in FIG. 6, the initial positioning of trailer 16 relative to vehicle 12 may be such that forward movement of vehicle 12 is needed within a desired vehicle path 32, such as when trailer 16 is located laterally to the side of vehicle 12. In this manner, path 32 may include various segments 33 that require forward driving or rearward driving of vehicle 12 separated by inflection points 90 at which vehicle 12 must transition between such forward and rearward driving. In an embodiment, path routine 66 can configured to include a straight backing segment 33 for a defined distance before reaching the point at which hitch ball 34 is aligned with hitch location 28. The remaining segments 33 can be determined to achieve the needed lateral and forward/backward movement within the smallest area possible and/or with the lowest number of overall segments 33 or inflection points 90. In the illustrated example of FIG. 6, path 32 can include two segments 33 that collectively traverse the needed lateral movement of vehicle 12, while providing a segment 33 of straight, rearward backing to bring hitch ball 34 into alignment with hitch location 28, one of which includes forward driving with a maximum steering angle $\delta_{max}$ in the rightward-turning direction and the other including forward driving with a maximum steering angle $\delta_{max}$ in the leftward-turning direction. Subsequently, a single inflection point 90 is included in which vehicle 12 transitions from forward driving to rearward driving followed by the previously-mentioned straight rearward backing segment 33. It is noted that variations in the depicted path 32 may be used, including a variation with a single forward-driving segment 33 at a rightward steering angle $\delta$ less than the maximum steering angle $\delta_{max}$, followed by an inflection point 90 and a rearward driving segment 33 at a maximum leftward steering angle $\delta_{max}$ with a shorter straight backing segment, with still further paths 32 being possible.

In an embodiment, the driver of vehicle 12 may retain control of the vehicle 12 transmission system 92, which is used for controlling whether vehicle 12 is in a forward driving gear or is in reverse. In such an embodiment, controller 26, upon determining that the vehicle position 36 corresponds with an inflection point 90 can prompt the driver, such as by a prompt 86 displayed on HMI 40, to change the gear, according to the direction of the segment 33 that follows the inflection point 90. In an aspect, controller 26 can use the positioning system 22, including dead reckoning device 24 to check whether the needed change in gear selection has been made by confirming that vehicle 12 is traveling in the desired direction before removing the prompt 86. Further, controller 26 can provide an audible prompt and/or can notify the user U that the system 10 will be disabled if the appropriate gear is not selected within a predetermined distance of continued movement of vehicle 12 in the wrong direction.

In an alternative embodiment, controller 26 can be in communication with transmission system 92, as shown in FIG. 2. In such an embodiment, controller 26 can directly confirm if the desired direction has been selected by the user. Alternatively, controller 26 and transmission system 92 can be configured such that controller 26 can change the direction of transmission system 92 directly. In such an embodiment, transmission system 92 can include, for example, an electronic gear selector 94, such as a rotary selector or a pushbutton selector, wherein the selection of a gear is made electronically and transmission system 92 configures itself electromechanically in response to the electronic communication. Accordingly, controller 26 can communicate with transmission system 92 either directly or through an electronic gear selector 94 to change the direction of the transmission, as needed, by controller 26 during execution of operating routine 68.

In a further embodiment, the driver of vehicle 12 may remain in control of the vehicle powertrain control system 72, including by control of a vehicle throttle 73, and the vehicle brake system 70. In such an embodiment, controller 26 can communicate to the driver by additional prompts 86 on HMI 40 to apply the vehicle throttle 73 or brakes, as needed to allow vehicle 12 to move at an appropriate speed for system 10, including such that controller 26 can accurately monitor the position 36 and/or implement the desired control of steering system 20 according to the responsiveness of steering motor 74, for example. In one aspect, controller 26 can deactivate operating routine 68 if, for example, the vehicle is traveling at an excessive speed, and can notify the driver via HMI 40, as needed, of such deactivation.

In an alternative embodiment, controller 26 can control the vehicle brake system 70 and the powertrain system 72 such that hitch assist system 10 can accelerate and decelerate vehicle 12, as needed, to cause the desired movement of vehicle 12, while controlling steering system 20 to maintain vehicle 12 along path 32, as discussed above. This control of the vehicle brake system 70 and the powertrain system 72 can be implemented in combination with the above-described control of transmission system 92 by controller 26 or by the driver. In one aspect, the configuration of system 10 with controller 26 in communication with and able to control steering system 20, powertrain system 72, brake system 70, and transmission system 92 can allow hitch assist system 10 to autonomously control vehicle 12 during a hitch alignment operation. This configuration can further allow a user U to remotely control vehicle 12 from an exterior 30 of vehicle 12 using a remote device 96, such as a smartphone (with appropriate software) or the like, as shown in FIG. 1.

Returning to FIGS. 6-9, hitch assist system 10, during execution of operating routine 68, can use the dead reckoning device 24 alone to track the location 36 of vehicle 12. In this manner, as controller 26 executes operating routine 68, it can receive data from dead reckoning device 24 regarding the position of vehicle 12, which dead reckoning device 24 determines based on information received from vehicle speed sensor 56 and vehicle yaw rate sensor 58 to monitor vehicle heading and movement in real-time. In an example, dead reckoning device 24 can also receive data from powertrain control system 72 and steering system 20 to further use to track vehicle 12 movement and/or position. In a further embodiment, controller 26 can also receive data from other devices in the positioning system 22, including from a global positioning system ("GPS") device or the like to serve as a check on dead reckoning device 24, when traveling over relatively long distances (i.e. at least 10 feet or in an embodiment at least 30 feet). In a further embodiment, controller 26 can receive data from one or more proximity sensors 54, such as an array or ultrasonic sensors mounted on the rear of vehicle 12 to potentially improve accuracy regarding the location 28 of hitch 14 at close distances thereto (e.g., with five feet or less).

Figure 10:
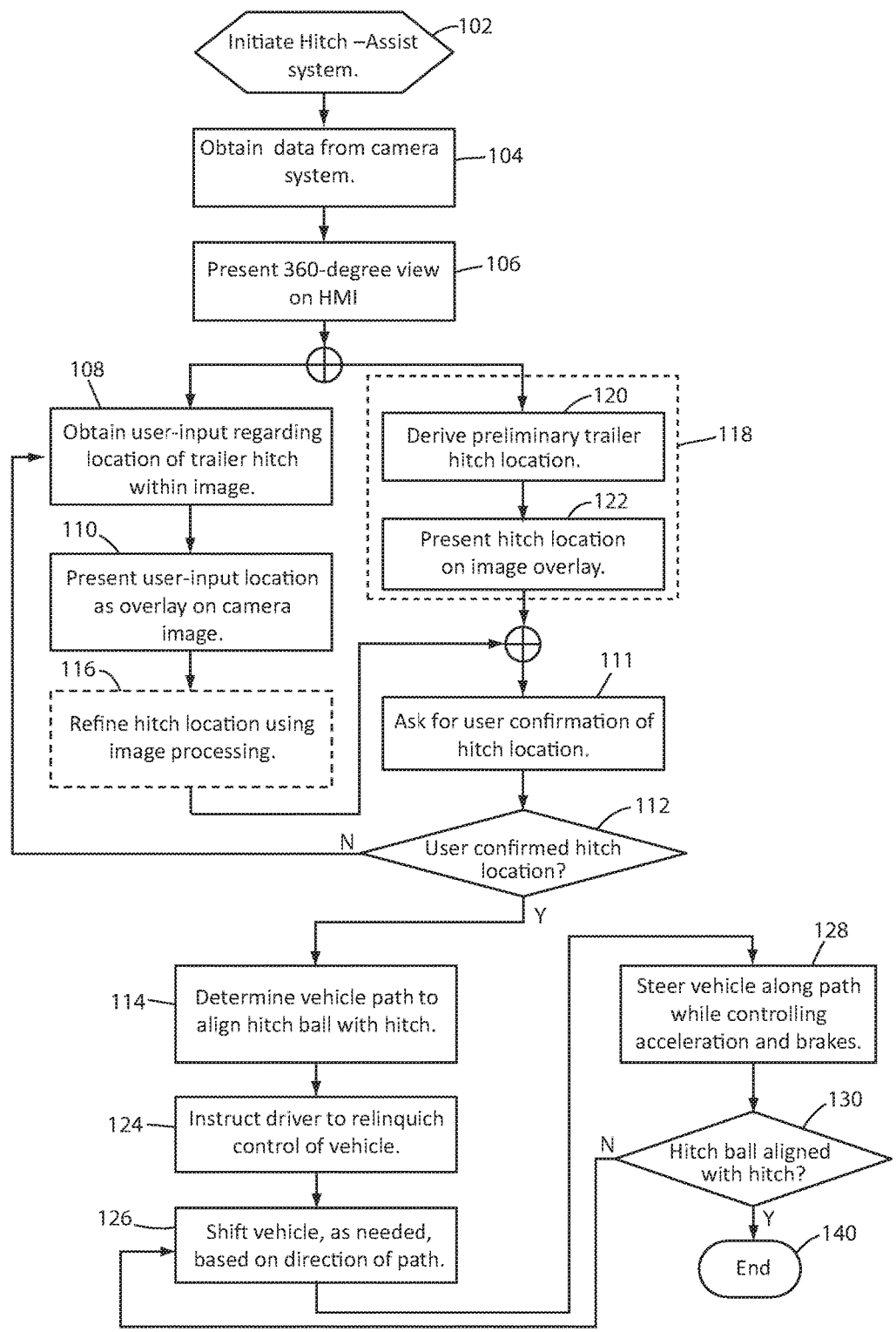
FIG. 10 is a flowchart depicting steps in the alignment sequence.

Turning now to FIG. 10, a flowchart showing steps in using hitch assist system 10 to align a vehicle hitch ball 34 with a trailer hitch 14 is shown. In particular, in step 102, the hitch assist system 10 is initiated. In an example, hitch assist system 10 can be initiated at any point when the user U can see hitch 14 in one or more images displayed by controller 26 from one or more cameras within camera system 18. In the illustrated example, the 360-degree, overhead view 30b is utilized, although other images may be used, as discussed above. Once hitch assist system 10 is activated, controller 26 can receive data from camera system 18 (step 104) and can present an image (step 106), such as the overhead image 36b discussed above and shown in FIGS. 3-5, including by assembling multiple images from multiple cameras within camera system 18, as discussed above. As in the embodiment discussed above, in step 108 hitch assist system 10 can obtain a user-input regarding the location 28 of the trailer hitch 14 with which the user U desires hitch assist system 10 to assist in alignment of vehicle 12 hitch ball 34. This input can be obtained by receiving a touch input from the touch circuitry 46 within touchscreen 42 upon, for example, a prompt 86 on touchscreen 42 for the user U to indicate the location of hitch 14 by way of a touch input over the location of the hitch 14 on touchscreen 42. In this manner, if the hitch 14 is not present within the image 30b, the user can visually locate the actual hitch 14 and drive vehicle 12 to a position in which hitch 14 is visible within image 30b before reactivating hitch assist system 10 (step 102).

When the user U locates the hitch 14 within image 30b, the user U can tap or touch touchscreen 42 on the location of hitch 14, which controller 26 can receive in step 108. Controller 26 can then present a location indicator 84 on image 30b in the location of the touch input (step 110) before prompting the user to confirm that the indicated area 84 is the correct location of hitch 14 within image 30b (step 111), which can be done, for example, by way of another prompt 86 presented on touchscreen 42, for example. If the user U confirms that the indicated area 84 of the location 28 of hitch 14 is accurate and as intended (step 112), hitch assist system 10 can proceed to execution of the path derivation routine 66 in step 114.

In an optional step (step 116), hitch assist system 10 can use image processing routine 64 to refine the stored location 28 of hitch 14 to a potentially greater accuracy than that which is obtained using the touch input received in step 108. In particular, controller 26 can include in memory 62, for example, data related to characteristics useable to identify a hitch 14, including size, shape, material/color characteristics, or the like, or other data, such as image characteristics similarly useable to locate or refine a location of a trailer hitch 14, at least within a predetermined area. Accordingly, this data can be used to locate an edge and/or center of hitch 14 within the area 84 corresponding with the user identification from image 30b in step 116. It is contemplated that such data can also be used to determine the direction in which trailer 16 is facing to determine a preferred angle of approach, for example.

In a similar, alternative subroutine 118, controller 26 can use a similar image processing routine 64 to derive a preliminary trailer hitch location 28 in step 120 without receiving prior input from user U. In such a subroutine 118, once a preliminary hitch location 28 has been derived, the target area 84 can be presented on touchscreen 42 (step 122). Subsequently, controller 26 can proceed to step 112, as discussed above, wherein user U is asked to confirm the preliminary hitch location 28. If the location is correct, further image processing can be used to refine the location, or system 10 can proceed to step 114, as discussed above. If the hitch location 28 is not confirmed, system 10 can prompt user U to provide a touch selection in step 108, as discussed above, before further refining (step 116) and final confirmation (step 112).

Once the hitch location 28 within image 30 has been determined, hitch assist system 10 proceeds to execute path derivation routine 66 in step 114, in which the hitch location 28 is placed within coordinate system 82 (FIG. 6) and correlated with the stored data relating the image coordinates with the real-world coordinates of the area to the exterior 30 of vehicle 12. Subsequently, controller 26 uses path derivation routine 66 to determine a path 32 to align hitch ball 34 with hitch location 28, as described above with respect to FIGS. 6-9. Once the path 32 has been derived, hitch assist system 10 can present the prompt 86, shown in FIG. 5, asking the user U to relinquish control of at least the steering wheel of vehicle 12 (and, optionally, the throttle 73 and brake, in the implementation of hitch assist system 10 described above wherein controller 26 assumes control of powertrain system 72 and brake system 70 during execution of operating routine 68) (step 124). When it has been confirmed that user U is not attempting to control steering system 20 (for example, using torque sensor 80, as discussed above), controller 26 determines if transmission system 92 is in the correct gear and, if necessary either causes transmission system 92 to shift to the desired gear or prompts the user U to shift to the desired gear (step 126). Hitch assist system 10 then controls steering system 20 (step 128) to maintain vehicle 12 along path 32 as either user U or controller 26 controls the velocity of vehicle 12 using powertrain system 72 and braking system 70. If vehicle 12 reaches an inflection point 90, further shifting or prompts to shift can be carried out. As discussed above, controller 26 or user U can control at least steering system 20 until vehicle 12 reaches a point at which the vehicle 12 hitch ball 34 is aligned with trailer 16 hitch 14 (step 130), at which point routine 68 can end (step 140), either by controlling brake system 70 to cause vehicle 12 to stop (which can be done progressively as vehicle 12 approaches such a point), or by issuing a command to user U to stop vehicle 12 (which can also be done progressively or by a countdown as vehicle 12 approaches the desired location).

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle hitch assistance system, comprising:
an imaging system;
a steering system;
a dead reckoning system; and
a controller:
    determining a hitch location within a vehicle exterior image received from the imaging system;
    deriving a vehicle path to align a hitch ball of the vehicle with the hitch location; and
    controlling the steering system to guide the vehicle along the path including tracking the location of the vehicle using information received from the dead reckoning system.

2. The hitch assistance system of claim 1, wherein:
the imaging system includes a plurality of cameras capturing images collectively surrounding the vehicle; and
the controller receives image data from each of the plurality of cameras and assembles the image data into the vehicle exterior image as an overhead view of an area surrounding the vehicle.

3. The hitch assistance system of claim 1, further including a human-machine interface comprising a touchscreen, wherein:
the controller further displays the vehicle exterior image on the touchscreen and determines the hitch location by receiving a user-indication of the hitch location through an input on the touchscreen.

4. The hitch assistance system of claim 3, wherein the controller further determines the hitch location by applying a coordinate system to the vehicle exterior image and correlating a location of the input on the touchscreen with the coordinate system.

5. The hitch assistance system of claim 3, wherein the controller further determines the hitch location by processing the vehicle exterior image within an area adjacent a location of the input to identify a hitch within the area.

6. The hitch assistance system of claim 1, further including a transmission system, wherein:
deriving the vehicle path includes determining at least one directional inflection point requiring a change in a condition of the transmission system between a forward-driving mode and a rearward-driving mode.

7. The hitch assistance system of claim 6, wherein, when tracking the location of the vehicle using information received from the dead reckoning system indicates that the location of the vehicle corresponds with the at least one direction inflection point, the controller indicates to a driver that the change in the condition of the transmission system is required.

8. The hitch assistance system of claim 6, wherein:
the controller is in communication with the transmission system; and
when tracking the location of the vehicle using information received from the dead reckoning system indicates that the location of the vehicle corresponds with the at least one direction inflection point, the controller causes the transmission system to implement the required change in condition thereof.

9. The hitch assistance system of claim 1, further including a brake system and a throttle, wherein:
the controller further controls the brake system and throttle to cause movement of the vehicle along the vehicle path in conjunction with controlling the steering system to guide the vehicle along the path.

10. A vehicle, comprising:
a plurality of cameras capturing images collectively surrounding the vehicle;
a human-machine interface including a display; and
a controller:
    assembling image data received from each of the plurality of cameras into an overhead vehicle exterior image;
    presenting the image on the display;
    receiving a user-indication of a hitch location through the human-machine interface; and
    deriving a vehicle path to move a hitch ball of the vehicle into the hitch location.

11. The vehicle of claim 10, further comprising:
a steering system; and
a vehicle positioning system;
wherein the controller further controls the steering system to guide the vehicle along the path including tracking the location of the vehicle using information received from the vehicle positioning system.

12. The vehicle of claim 11, wherein the vehicle positioning system is a dead reckoning system.

13. The vehicle of claim 11, further including a transmission system, wherein:
deriving the vehicle path includes determining at least one directional inflection point requiring a change in a condition of the transmission system between a forward-driving mode and a rearward-driving mode;
the controller is in communication with the transmission system; and
when tracking the location of the vehicle using information received from the vehicle positioning system indicates that the location of the vehicle corresponds with the at least one direction inflection point, the controller causes the transmission system to implement the required change in condition thereof.

14. The vehicle of claim 10, wherein the display of the human-machine interface is a touchscreen, wherein:
the controller receives the user-indication of the hitch location through an input on the touchscreen.

15. The vehicle of claim 14, wherein the controller further applies a coordinate system to the vehicle exterior image and correlates the user-indication of the hitch location on the touchscreen with the coordinate system.

16. The vehicle of claim 15, wherein the controller further determines the hitch location by processing the vehicle exterior image within an area adjacent a location of the input to identify a hitch within the area.

17. A method for guiding a vehicle into alignment with a trailer hitch, comprising:
- presenting an overhead vehicle exterior image on a display within the vehicle;
- receiving a user input indicating an area on the display;
- correlating the area on the display with a coordinate system applied to the image and setting the input location as a hitch location;
- deriving a vehicle path to align a hitch ball of the vehicle with the hitch location; and
- controlling a vehicle steering system to guide the vehicle along the path.

18. The method of claim 17, wherein:
- deriving the vehicle path includes determining at least one directional inflection point requiring a change in a condition of a vehicle transmission system between a forward-driving mode and a rearward-driving mode; and
- when tracking the location of the vehicle using information received from the vehicle positioning system indicates that the location of the vehicle corresponds with the at least one direction inflection point, causing the transmission system to implement the required change in the condition thereof.

19. The method of claim 17, further comprising:
- capturing images collectively surrounding the vehicle using a plurality of cameras; and
- assembling the image data into the vehicle exterior image.

20. The method of claim 19, wherein the display is a touchscreen and the user input is a touch input on the area of the display.

* * * * *